March 20, 1962 H. C. GREGSON 3,025,899
TRACTION DEVICE
Filed Jan. 4, 1961

Henry C. Gregson
INVENTOR.

BY *Clarence A. O'Brien*
*and Harvey B. Jacobson*
Attorneys 3,025,899
TRACTION DEVICE
Henry C. Gregson, Raleigh, N.C.
(Rte. 3, Lillington, N.C.)
Filed Jan. 4, 1961, Ser. No. 80,644
10 Claims. (Cl. 152—178)

This invention relates to traction devices, and particularly to a flexible and resilient elongated traction device which may be applied over the tread of an ordinary pneumatic vehicle tire for increasing the gripping area thereof and improving the traction thereof in mud and snow.

Accordingly, it is the primary object of my invention to provide a traction device that may be removably attached to pneumatic vehicle tires for improving the traction thereof in mud and snow and yet permit the vehicle to operate satisfactorily on paved surfaces.

The conventional metal chains now used on automotive pneumatic tires are of little use once the vehicle on which they are used reaches the main highway which has been cleared of mud and snow. This is because the rigidity, hardness and irregularity of the chains causes vibration in the vehicle, quickly wear out due to the abrasive action of the hard pavement, damage the pavement, and after the chains break, they may cause severe damage to the fenders and finished surfaces of the vehicle.

Accordingly, it is the primary object of this invention to provide an improved traction device for vehicle wheels which will not make a noise or vibration when used on hard pavement, will not injure the fenders or finish of the vehicle even when broken, have a large tread area for providing effective traction and support in mud and snow, and yet are economical to produce and long lasting in use.

It is another object of the invention to provide a device which not only improves the traction of the vehicle tires, but also protects the tires from punctures or damage caused by tacks, glass, stones, ice particles, etc.

It is another object of the invention to provide an improved structure for securely locking onto a vehicle tire a flexible traction device.

It is yet another object of the invention to provide a traction device for improving the traction of vehicle tires in snow and ice which may be easily installed on and left on the tires during the entire winter season.

A still further object of the invention is to provide a traction device for vehicle wheels which not only will increase the width of the wheel tread, but will also increase the circumference thereof, thereby improving the traction of the device in soft snow or mud.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
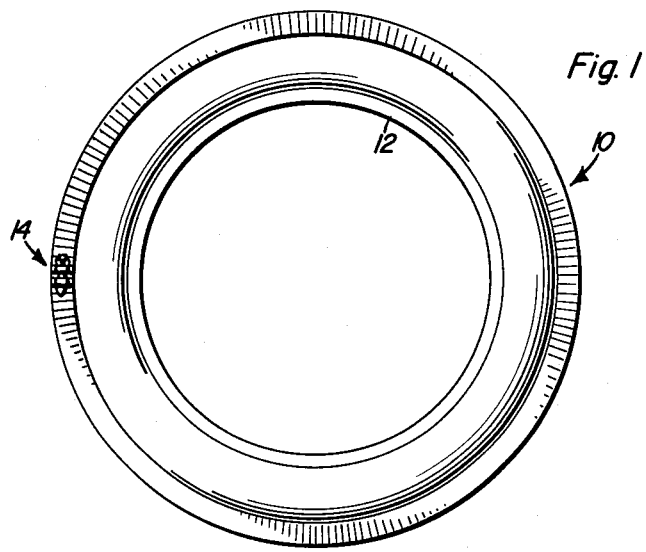
FIGURE 1 is a side elevational view illustrating my traction device mounted on a conventional rubber pneumatic tire.

As shown in the drawings, my traction device 10 is designed to encircle the tread of a tire 12 and be clamped thereon by fastening devices 14.

Figure 2:
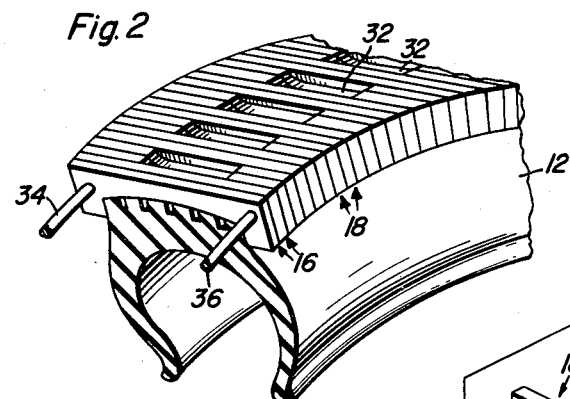
FIGURE 2 is a perspective view on an enlarged scale illustrating a portion of my traction device mounted on a portion of a tire.
Figure 3:
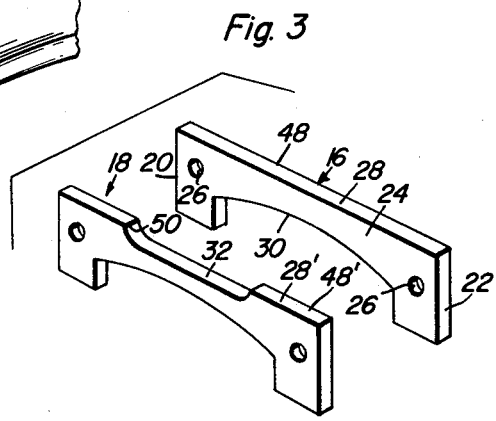
FIGURE 3 is an enlarged perspective view illustrating two of the tread segments.

As shown in FIGURE 2, the traction device 10 includes a plurality of segments 16 and 18 which are of generally U-shape in elevation. Each of the segments 16 and 18 are cut from the carcass of an old tire so that the grain of the tread is crosswise or transverse to the tread of the tire 12. Each of the segments 16 includes parallel side legs 20 and 22 integrally connected by a bight portion 24. The upper surface of the bight portion 24 forms a portion of the tread of the traction device while the inner surface of the bight portion is concave so as to fit the tread of a conventional tire. A bore 26 is formed through each of the legs 20 and 22 the same distance below the tread surface 28 of the bight portion 24. However, the bores 26 are spaced a greater distance from the tread surface 28 than is the central portion of the arcuate edge 30 of the bight portion. Preferably, the legs 20 and 22 extend laterally outwardly approximately one-half of an inch.

The segments 18 are substantially identical to the segments 16 except the tread surface 28' thereof is formed with U-shaped or arcuate recesses 32.

The segments 16 and 18 are strung alternately on parallel steel cables 34 and 36 which extend through the bores 26. Preferably, a sufficient number of segments 16 are placed in side-by-side relationship so as to equal approximately one inch in thickness and then these groups of segments are alternated with a series of segments 18 sufficient in number to equal approximately one inch in peripheral thickness. As shown in the drawings, two segments 16 are placed in side-by-side relationship and the groups of segments 16 alternate with groups of segments 18 which are also arranged in groups of two.

The segments 16 and 18 extend over substantially the entire length of the cables 34 and 36.

Figure 4:
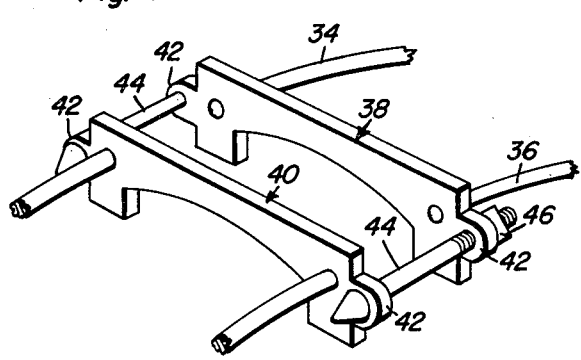
FIGURE 4 is an enlarged perspective view illustrating how the ends of my traction device are connected together.

As shown in FIGURE 4, a pair of metal segments 38 and 40 are welded to the ends of the steel cables 34 and 36. The segments 38 and 40 are substantially identical in shape and size to the segments 16 except for the fact that each segment is provided with a laterally outwardly projecting ear 42. Each of the ears 42 has a bore therein adapted to receive the shank of a conventional headed bolt 44. One end of each bolt 44 is threaded and mates with an internally threaded nut 46.

To assemble the traction device on the tire 12, it is only necessary to lay the traction device 10 flat upon the ground and drive the vehicle to a position where the tire is supported on the central portion of the traction device. Then the traction device is encircled around the tire and the ends thereof are connected together by the bolts 44 and nuts 46 as illustrated in FIGURE 4. The rubber and fabric segments 16 and 18 are rather tightly compressed between the plates 38 and 40 on the cables 34 and 36 so as to enclose the recesses 32 between the outer portions of the segments 16. Thus the recesses 32 when they engage the surface of the rod act as suction cups since the air is partially squeezed out of the recesses by the weight of the vehicle thereon. Also, the edges 48 of the segments 16 are relatively sharp and tend to bite into snow and ice for further improving the traction. Also, the edges 50 in the segments 18 improve the traction of the device 10 so as to prevent lateral or sideways slippage of the wheels on the road. Since the cables 34 and 36 overlap or are radially inwardly of the tread of the tire 12, they positively prevent the traction device from moving laterally relative to the tire.

If the space between the metal segments 38 and 40 is excessive after the device 10 is installed on the tire, additional segments similar to the segments 16 and 18 may be mounted between the metal plates or segments.

The segments 16 and 18 are preferably die cut from the carcass of the above mentioned old tire. As shown in the drawings, the segments 16 and 18 are of substantially the same thickness as the side wall of the tire 12. This provides a relatively large number of gripping edges 48 and 48' for effective traction.

Figure 5:
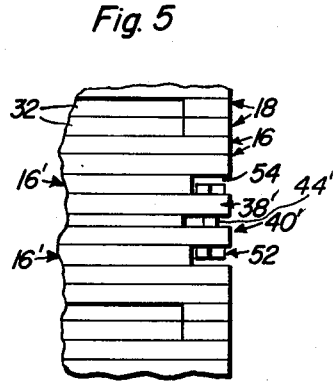
FIGURE 5 is a plan view of a modification of the means for coupling the ends of the traction device together.

If it is desired that the connecting bolts do not extend or protrude laterally outwardly beyond the edges of the segments 16 and 18, the steel plates connected to the ends of the cables could be made the same width as the segments 16 and 18 as shown at 38' and 40' in FIGURE 5. Holes are provided in the edge portions of the segments 38' and 40' for receiving nut and bolt assemblies 52 which includes a bolt 44'. The bores for the nut and bolt assemblies of course have to be slightly spaced from the ends of the cables 34 and 36. A modified rubber and fabric segment 16' could be placed directly adjacent the plates 38' and 40'. These segments 16' would be similar to the segments 16 except an outer portion of the legs 20 and 22 would be removed so as to provide recesses for the nut and bolt assemblies.

Since the traction device 10 is composed primarily of rubber and the tread of the tire 12 is also composed of rubber, the high coefficient of friction therebetween would prevent relative slippage between the traction device 10 and tire 12. If desired, portions of the segments 16 and 18 could be vulcanized together, but it is contemplated that ordinarily this would not be necessary or desirable.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

I claim as my invention:

1. A flexible anti-skid covering for pneumatic tires, said covering having an outer friction surface and comprising a plurality of segments extending transversely of said covering composed of resilient and flexible material, said segments each having generally radially extending parallel sides which abut the sides of adjacent segments, the outer surfaces of alternate segments having recesses formed therein adapted to retain a suction when in contact with a relatively smooth traction surface, flexible elongated means extending longitudinally of said covering and connected to said segments for holding them in assembled relationship, connecting means attached to the ends of said flexible means for releasably securing the ends together around said tire.

2. A covering as defined in claim 1 wherein said flexible means comprises at least one metallic cable extending through said segments on each side of the covering.

3. A device as defined in claim 2 wherein said segments are composed primarily of rubber.

4. A device as defined in claim 2 wherein said segments comprise rubber and fabric and are cut from the carcass of an old pneumatic tire.

5. A device as defined in claim 3 wherein the radially outwardly facing surfaces of the segments are substantially flat.

6. A device as defined in claim 5 wherein the radially inwardly facing surfaces of said segments are concave, the center of the concave surfaces extending radially outwardly a greater distance than said flexible means.

7. A device as defined in claim 2 wherein each end of said covering comprises a metallic segment of substantially the same shape and size as the flexible segments and said cables have their ends secured to said metallic segments.

8. A device as defined in claim 7 wherein opposing ends of said metallic segments are adjustably bolted together.

9. In combination, a conventional pneumatic tire composed of rubber and fabric and a flexible anti-skid covering enclosing the tread of said tire, said tread being substantially flat in an axial direction, said covering comprising a plurality of segments extending transversely of said tread composed of resilient and flexible material, said segments each having generally radially extending parallel sides which abut the sides of adjacent segments, the outer surfaces of alternate segments having recesses formed therein adapted to retain a suction when in contact with a relatively smooth traction surface, flexible elongated means extending longitudinally of said covering and connected to said segments for holding them in assembled relationship, connecting means attached to the ends of said flexible means for releasably securing the ends together around said tire, said covering also having a tread substantially flat and concentric with the tire tread, the covering tread being substantially wider than the tire tread.

10. The combination defined in claim 9 wherein said segments are composed of the same material as said tire and the distance between said sides is substantially equal to the thickness of the side walls of the tire.

References Cited in the file of this patent

UNITED STATES PATENTS

| | | |
|---|---|---|
| 881,905 | Cregier | Mar. 17, 1908 |
| 1,399,430 | Ink | Dec. 6, 1921 |
| 1,424,524 | Seavey | Aug. 1, 1922 |
| 1,453,530 | Shuey | May 1, 1923 |